(12) United States Patent
Urano et al.

(10) Patent No.: US 11,776,758 B2
(45) Date of Patent: Oct. 3, 2023

(54) CAPACITOR

(71) Applicant: Panasonic Intellectual Property Management Co., Ltd., Osaka (JP)

(72) Inventors: Yuki Urano, Ishikawa (JP); Ayaka Nakada, Toyama (JP); Akihiro Ozaki, Shimane (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 133 days.

(21) Appl. No.: 17/485,309

(22) Filed: Sep. 24, 2021

(65) Prior Publication Data

US 2022/0013298 A1  Jan. 13, 2022

Related U.S. Application Data

(63) Continuation of application No. PCT/JP2020/017889, filed on Apr. 27, 2020.

(30) Foreign Application Priority Data

May 24, 2019 (JP) ................................ 2019-097692

(51) Int. Cl.
*H01G 4/38* (2006.01)
*H01G 2/08* (2006.01)
(Continued)

(52) U.S. Cl.
CPC ............. *H01G 4/38* (2013.01); *H01G 2/08* (2013.01); *H01G 4/012* (2013.01); *H01G 4/224* (2013.01); *H01G 4/228* (2013.01); *H01G 4/32* (2013.01)

(58) Field of Classification Search
CPC ........... H01G 4/38; H01G 2/08; H01G 4/012; H01G 4/224; H01G 4/228; H01G 4/32
(Continued)

(56) References Cited

U.S. PATENT DOCUMENTS

| 2009/0040685 A1* | 2/2009 | Hiemer | H01G 9/028 |
| | | | 361/301.5 |
| 2015/0348710 A1* | 12/2015 | Sato | H01G 2/04 |
| | | | 29/25.42 |

(Continued)

FOREIGN PATENT DOCUMENTS

| JP | 2011-091250 | 5/2011 |
| WO | 2016/084180 | 6/2016 |

OTHER PUBLICATIONS

International Search Report of PCT application No. PCT/JP2020/017889 dated Jul. 28, 2020.

*Primary Examiner* — Arun Ramaswamy
(74) *Attorney, Agent, or Firm* — McDermott Will & Emery LLP

(57) ABSTRACT

A capacitor includes a capacitor element, a bus bar connected to an electrode of the capacitor element, a case housing the capacitor element, and a filling resin filled in the case. The bus bar includes a first section and a second section. The first section is exposed from the filling resin and includes a connection terminal configured to be connected to an external terminal. The second section has a buried section buried in the filling resin and an exposed section exposed from the filling resin, and includes a connection part connected to the electrode. The exposed section is located away from the first section.

13 Claims, 7 Drawing Sheets

(51) Int. Cl.
*H01G 4/012* (2006.01)
*H01G 4/224* (2006.01)
*H01G 4/228* (2006.01)
*H01G 4/32* (2006.01)

(58) Field of Classification Search
USPC ............ 361/301.4, 306.3, 301.5, 328, 301.3
See application file for complete search history.

(56) References Cited

U.S. PATENT DOCUMENTS

2017/0062134 A1\* 3/2017 Koyama .................. H01G 4/38
2017/0236774 A1 8/2017 Fushie et al.
2018/0233285 A1\* 8/2018 Sato ......................... H01G 4/18

\* cited by examiner

CAPACITOR

RELATED APPLICATIONS

This application is a continuation of the PCT International Application No. PCT/JP2020/017889 filed on Apr. 27, 2020, which claims the benefit of foreign priority of Japanese patent application No. 2019-097692 filed on May 24, 2019, the contents all of which are incorporated herein by reference.

TECHNICAL FIELD

The present disclosure relates to a capacitor.

BACKGROUND

Unexamined Japanese Patent Publication No. 2011-091250 discloses a capacitor in which an opening side bus bar and a bottom surface side bus bar are respectively connected to electrode surfaces provided at both ends of a capacitor element, and both of the capacitor element and the bus bar are housed in a housing case. Each of the opening side bus bar and the bottom surface side bus bar has a connection terminal for external device connection. The housing case is filled with resin, and the capacitor element and a part of each of these two bus bars other than the connection terminal are buried in the resin.

SUMMARY

A main aspect of the present disclosure relates to a capacitor. A capacitor according to the present aspect includes a capacitor element, a first bus bar connected to a first electrode of the capacitor element, a case housing the capacitor element, and a filling resin filled in the case. Here, the first bus bar includes a first section and a second section. The first section is exposed from the filling resin and includes a connection terminal configured to be connected to an external terminal. The second section has a buried section buried in the filling resin and an exposed section exposed from the filling resin, and includes a connection part connected to the first electrode. The exposed section is located away from the first section.

The present disclosure makes it possible to provide a capacitor in which overheating hardly occurs during energization.

Effects or meanings of the present disclosure will be further clarified by the following description of an exemplary embodiment. However, the exemplary embodiment described below is merely examples for implementing the present disclosure, and the present disclosure is not limited to the description in the following exemplary embodiment at all.

DESCRIPTION OF EMBODIMENT

Figure 1A:
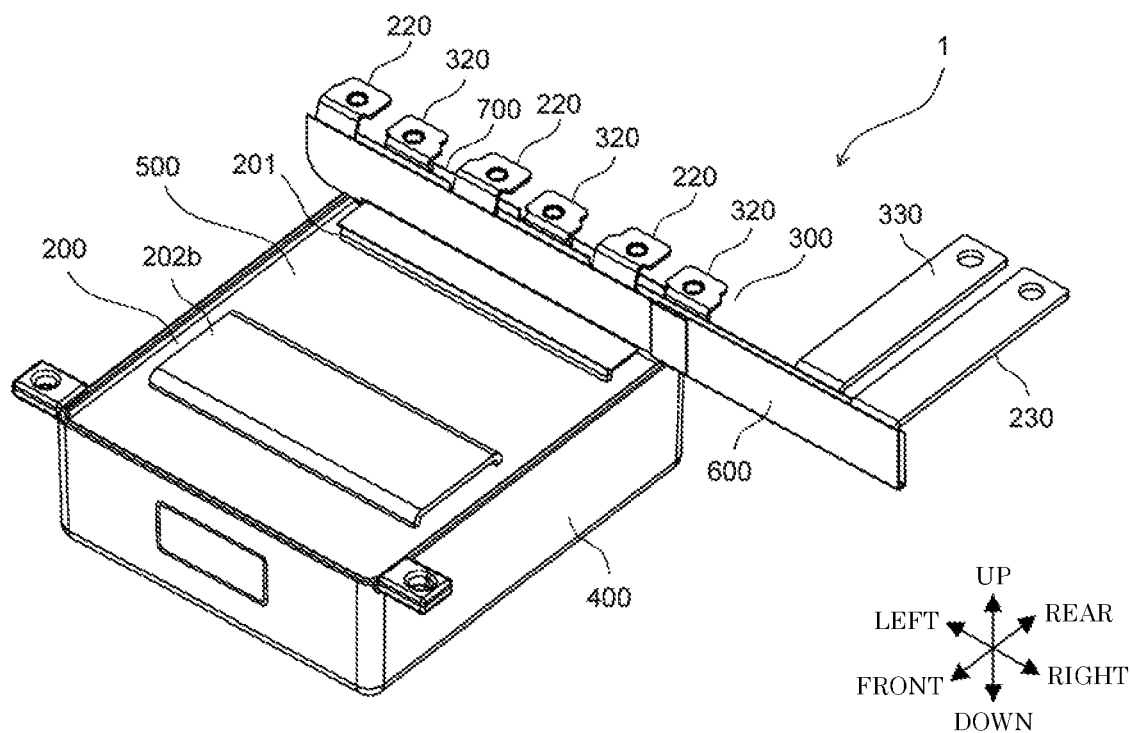
FIG. 1A is a perspective view illustrating a film capacitor according to an exemplary embodiment.

When the capacitor is energized, the capacitor element and the bus bars generate heat by a current flowing therethrough. In the capacitor as described in Unexamined Japanese Patent Publication No. 2011-091250, since the capacitor element and the part of each of the two bus bars other than the connection terminal are buried in the resin, the generated heat is hardly released to outside. Thus, it is a concern that the entirety of the capacitor is likely to overheat during energization.

In view of such problem, the present disclosure provides a capacitor in which overheating hardly occurs during energization.

Hereinafter, film capacitor 1 according to an exemplary embodiment of a capacitor of the present disclosure will be described with reference to the drawings. For convenience, front and rear, left and right, and up and down directions are appropriately indicated in the drawings. Note that each illustrated direction merely indicates a relative direction of film capacitor 1, and does not indicate an absolute direction. Further, for convenience of description, some configurations such as a "bottom surface" and a "front surface" may be named according to the illustrated direction.

In the present exemplary embodiment, film capacitor 1 corresponds to a "capacitor" described in the claims. First end surface electrode 110 and second end surface electrode 120 respectively correspond to a "first electrode" and a "second electrode" described in the claims. First bus bar 200 corresponds to a "first bus bar" described in the claims, and second bus bar 300 corresponds to a "second bus bar" described in the claims.

However, the above description is merely intended to associate the configurations in the claims with the configurations in the exemplary embodiment, and the disclosure described in the claims is not limited to the configuration of the exemplary embodiment at all by the above association.

Figure 1B:
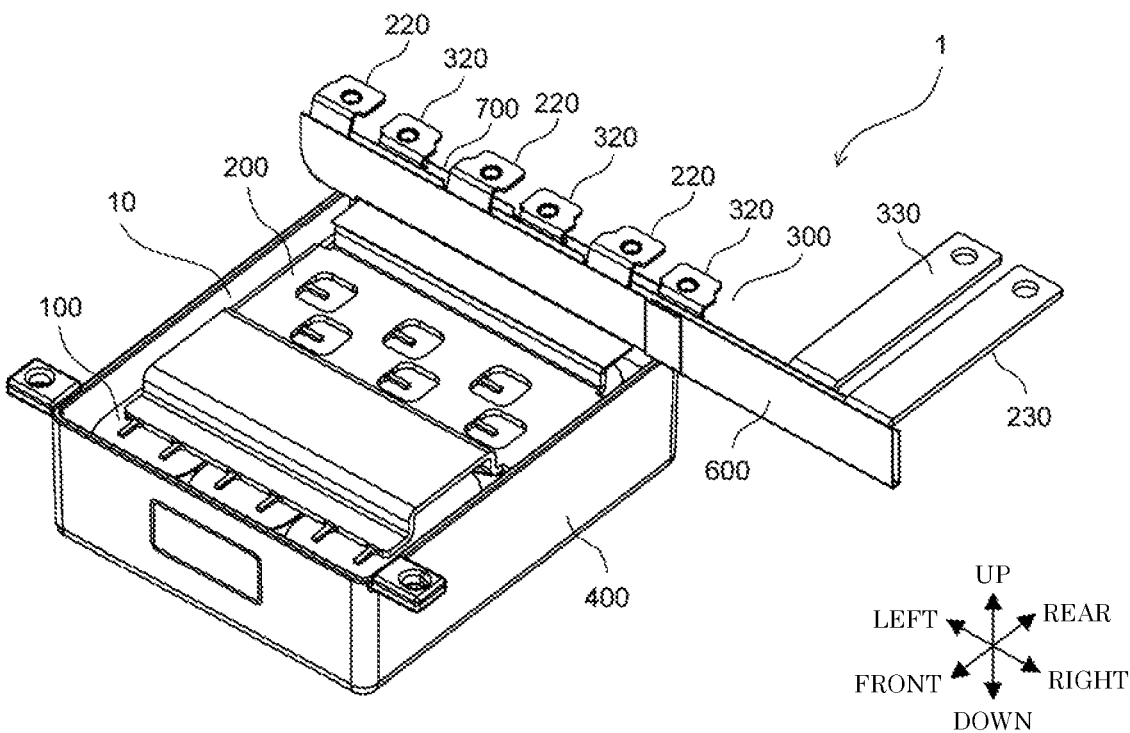
FIG. 1B is a perspective view illustrating the film capacitor according to the exemplary embodiment before a case is filled with a filling resin.

FIG. 1A is a perspective view illustrating film capacitor 1, and FIG. 1B is a perspective view illustrating film capacitor 1 before case 400 is filled with filling resin 500.

As shown in FIGS. 1A and 1B, film capacitor 1 includes six capacitor elements 100, first bus bar 200, second bus bar 300, case 400, and filling resin 500. Capacitor element unit 10 is configured by assembling six capacitor elements 100, first bus bar 200, and second bus bar 300 so as to be integrated. Capacitor element unit 10 is housed in case 400, and case 400 is filled with filling resin 500. Filling resin 500 is a thermosetting resin, for example, an epoxy resin. By case 400 and filling resin 500, a part of capacitor element unit 10 buried in filling resin 500 is protected from moisture and impact.

Figure 2:
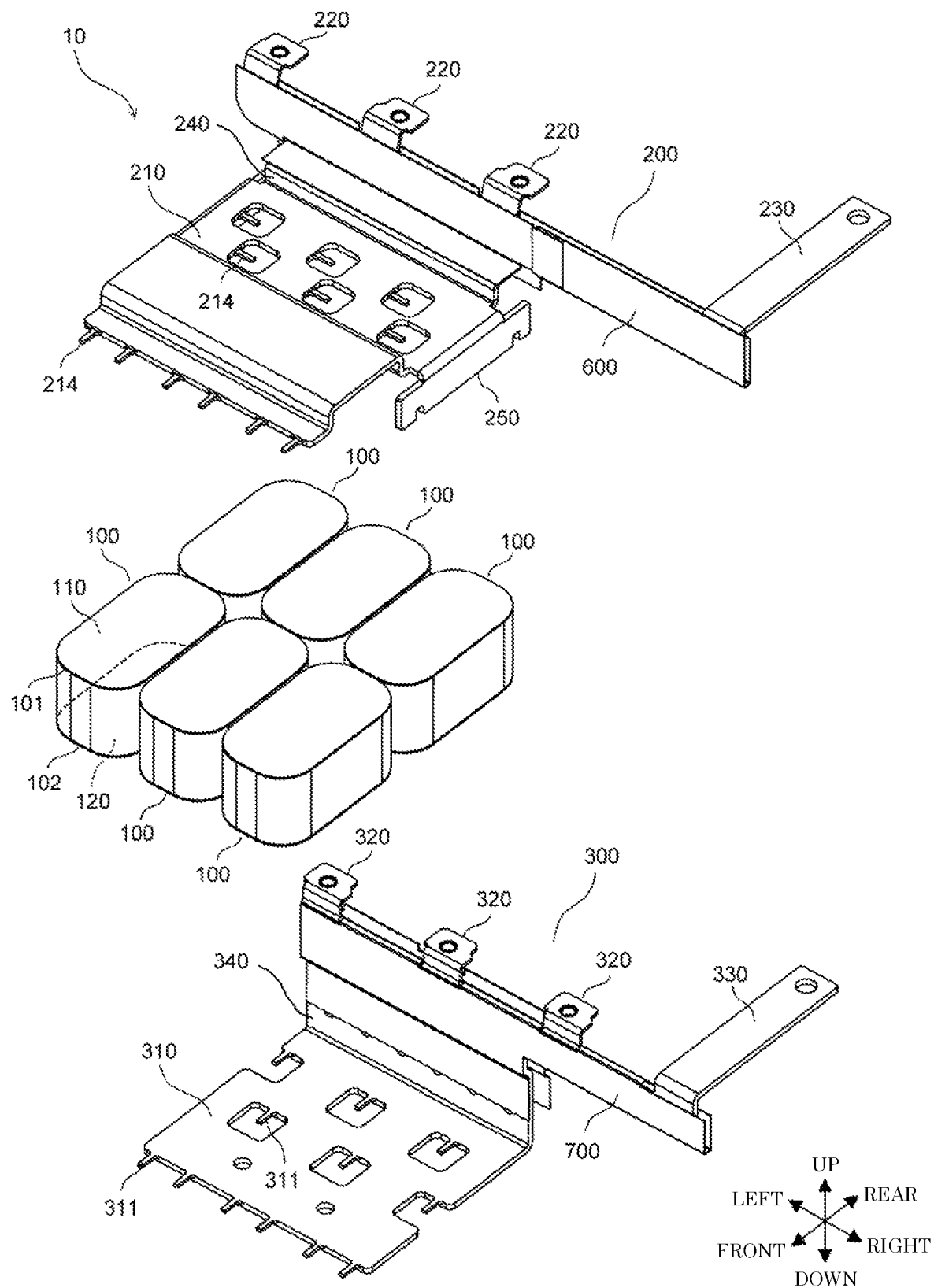
FIG. 2 is an exploded perspective view illustrating a capacitor element unit according to the exemplary embodiment.

FIG. 2 is an exploded perspective view illustrating capacitor element unit 10.

Each capacitor element 100 is formed by stacking two metallized films with aluminum vapor-deposited on a dielectric film, winding or laminating the stacked metallized films, and pressing the stacked metallized films into a flat shape. Capacitor element 100 has a shape similar to a flat elliptic cylinder. In capacitor element 100, first end surface electrode 110 is formed on first end surface 101 by spraying metal such as zinc, and second end surface electrode 120 is formed on second end surface 102 by spraying metal such as zinc. Six capacitor elements 100 are arranged in two rows of a front row and a rear row, and three capacitor elements 100 are disposed in each of the rows, in a state that both end surfaces 101, 102 of each of six capacitor elements 100 facing in an up-down direction. First bus bar 200 and second bus bar 300 are connected to these six capacitor elements 100 in this state.

Each capacitor element 100 according to the present exemplary embodiment is formed by metallized films in which aluminum is deposited on a dielectric film. Alternatively, capacitor element 100 may be formed by a metallized film in which another metal such as zinc or magnesium is deposited. Alternatively, capacitor element 100 may be formed by a metallized film on which a plurality of metals of these metals is vapor-deposited, or may be formed by a metallized film on which an alloy of these metals is vapor-deposited.

Figure 3A:
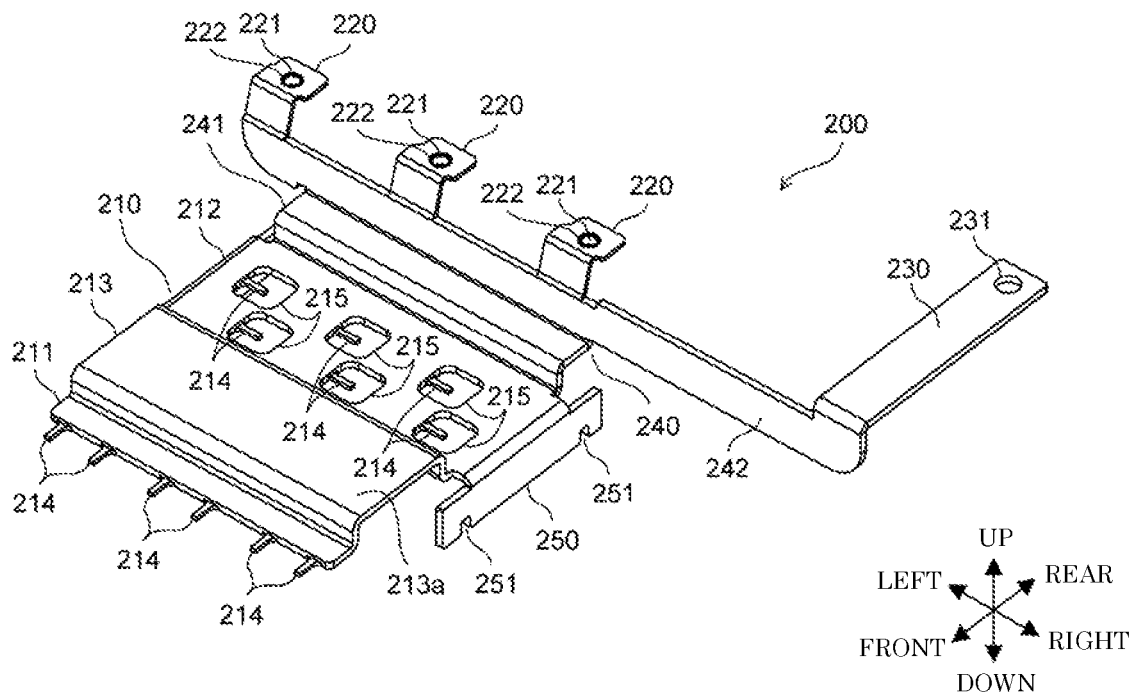
FIG. 3A is a perspective view illustrating a first bus bar according to the exemplary embodiment as viewed from a front upper side.
Figure 3B:
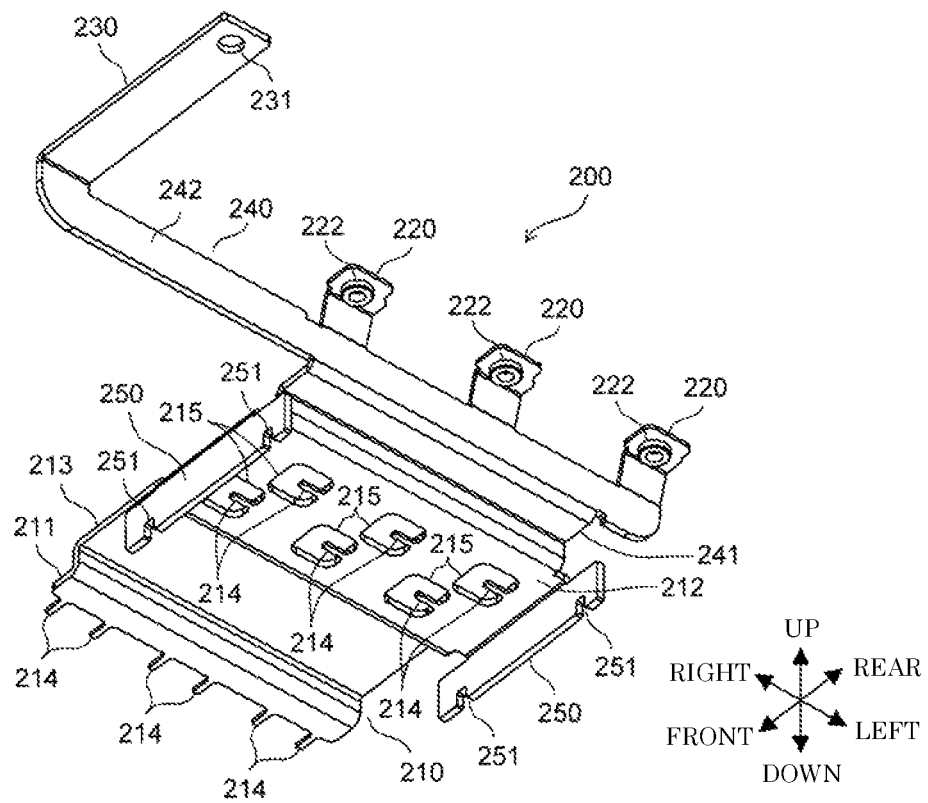
FIG. 3B is a perspective view illustrating the first bus bar according to the exemplary embodiment as viewed from a rear lower side.

FIGS. 3A and 3B are perspective views illustrating first bus bar 200 as viewed from a front upper side and a rear lower side, respectively.

First bus bar 200 is formed by appropriately cutting out and bending a conductive material, for example, a copper plate, and has a configuration in which electrode terminal 210, three first connection terminals 220, second connection terminal 230, relay terminal 240, and two supports 250 are integrated. In the present exemplary embodiment, first bus bar 200 is a negative-pole bus bar.

Electrode terminal 210 has a rectangular shape as viewed from above, and covers first end surface electrodes 110 of six capacitor elements 100 from above. Electrode terminal 210 includes elongated rectangular front plate 211, rectangular rear plate 212, and protrusion 213 disposed between front plate 211 and rear plate 212. Protrusion 213 protrudes upward in a rectangular wave shape. An upper surface of protrusion 213 includes flat surface 213a.

Six connection pins 214 are formed at a front end of front plate 211 so as to be aligned in a left-right direction. Further, six openings 215 formed in rear plate 212 are arranged in two rows of front row and rear row so that openings 215 in the front row and openings 215 in the rear row are slightly deviated from each other in the left-right direction. And connection pin 214 is formed at a left edge of each opening 215.

Two connection pins 214 of front plate 211 are in contact with first end surface electrode 110 of each of capacitor elements 100 in the front row, and two connection pins 214 of rear plate 212 are in contact with first end surface electrode 110 of each of capacitor elements 100 in the rear row. Each connection pin 214 is bonded to corresponding first end surface electrode 110 by a bonding method such as soldering. Accordingly, first bus bar 200 is electrically connected to first end surface electrodes 110 of six capacitor elements 100. Since a thickness of each connection pin 214 is smaller than a thickness of other parts of electrode terminal 210, heat capacity of connection pins 214 is small, and thus soldering or the like is easily performed.

By relay terminal 240, electrode terminal 210 is relayed to three first connection terminals 220 and second connection terminal 230. Relay terminal 240 includes lower plate 241 and upper plate 242. Lower plate 241 extends upward from a rear end of electrode terminal 210, then is bent, and extends rearward. And upper plate 242 rises from a rear end of lower plate 241, then slightly protrudes leftward from lower plate 241, and greatly protruding rightward.

Three first connection terminals 220 are provided at an upper end of upper plate 242 of relay terminal 240 so as to be aligned in the left-right direction at equal intervals. Each first connection terminal 220 has a hook shape that extends upward, then is bent, and extends rearward. Circular through hole 221 is formed in each first connection terminal 220. Nut 222 is fitted into through hole 221.

Second connection terminal 230 is provided at a right end of the upper end of upper plate 242 of relay terminal 240. Second connection terminal 230 has a shape that slightly extends upward, is bent, and extends rearward long. Circular through hole 231 is formed at a distal end of second connection terminal 230.

Each of two supports 250 is provided so as to hang down from left and right ends of rear plate 212 of electrode terminal 210, and has an elongated rectangular shape. Two fitting ports 251 each having an inverted U-shape are formed at a lower end of each support 250.

Figure 4A:
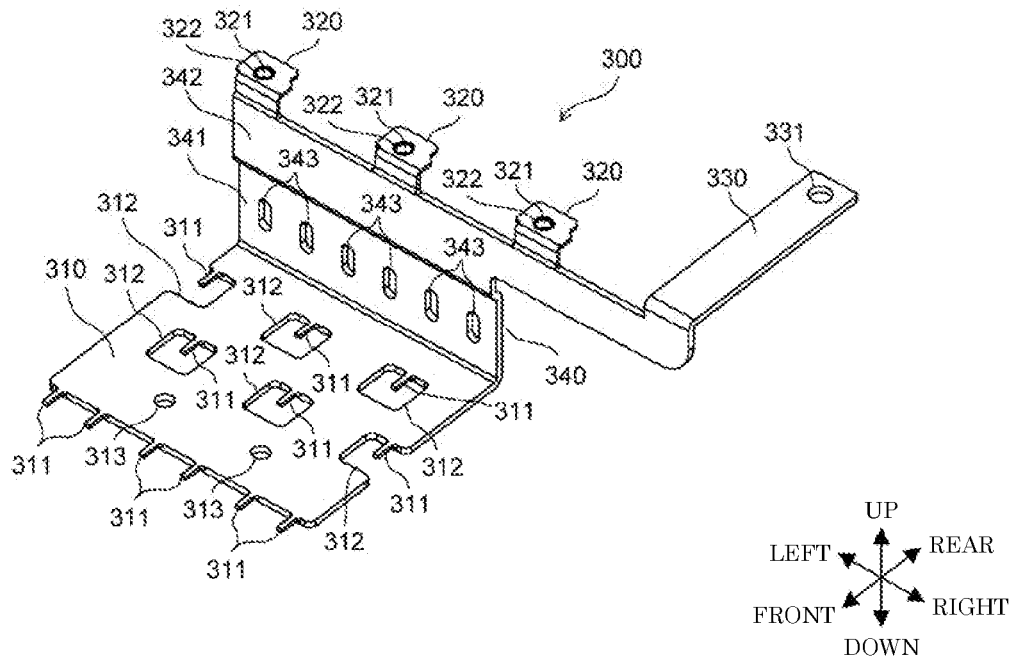
FIG. 4A is a perspective view illustrating a second bus bar according to the exemplary embodiment as viewed from the front upper side.
Figure 4B:
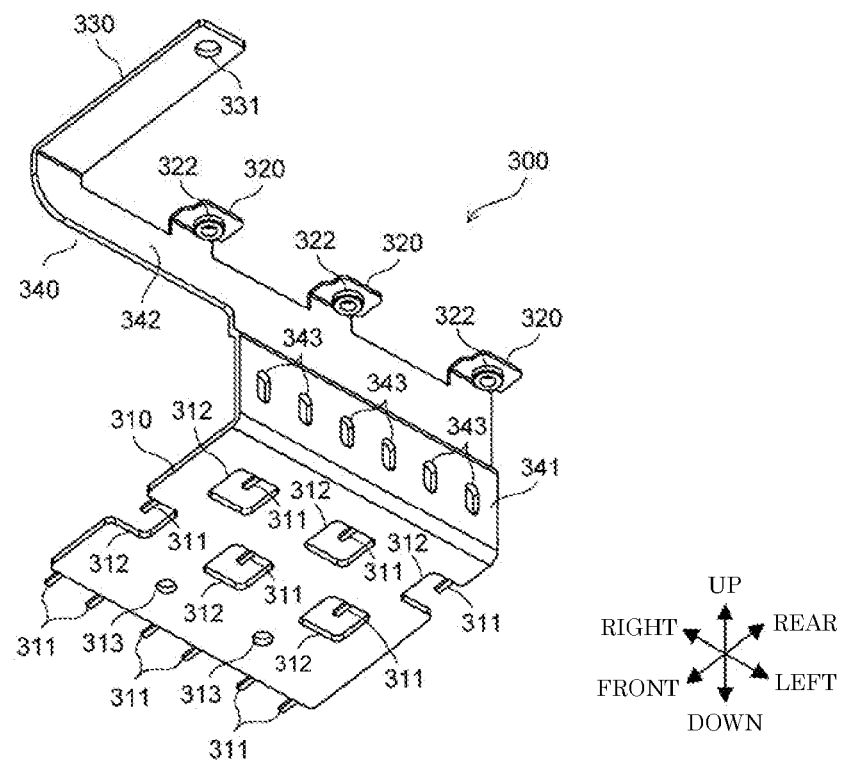
FIG. 4B is a perspective view illustrating the second bus bar according to the exemplary embodiment as viewed from the rear lower side.

FIGS. 4A and 4B are perspective views of second bus bar 300 as viewed from the front upper side and the rear lower side, respectively.

Second bus bar 300 is formed by appropriately cutting out and bending a conductive material, for example, a copper plate, and has a configuration in which electrode terminal 310, three first connection terminals 320, second connection terminal 330, and relay terminal 340 are integrated. In the present exemplary embodiment, second bus bar 300 is a positive-pole bus bar.

Electrode terminal 310 has a rectangular shape, and covers second end surface electrodes 120 of six capacitor elements 100 from below. Six connection pins 311 are formed at a front end of electrode terminal 310 so as to be aligned in the left-right direction. Further, six openings 312 formed in electrode terminal 310 are arranged in two rows of front row and rear row so that openings 312 in the front row and openings 312 in the rear row are deviated from each other in the left-right direction. And connection pin 311 is formed at a rear edge of each opening 312. Further, in electrode terminal 310, two circulation holes 313 each having a circular shape are formed at a front side with respect to six openings 312.

Two connection pins 311 of electrode terminal 310 are in contact with second end surface electrode 120 of each capacitor element 100. Each connection pin 311 is bonded to corresponding second end surface electrode 120 by a bonding method such as soldering. Consequently, second bus bar 300 is electrically connected to second end surface electrodes 120 of six capacitor elements 100. Since a thickness of each connection pin 311 is smaller than a thickness of other parts of electrode terminal 310, heat capacity of connection pin 311 is small, and thus soldering or the like is easily performed.

By relay terminal 340, electrode terminal 310 is relayed to three first connection terminals 320 and second connection terminal 330. Relay terminal 340 includes lower plate 341 and upper plate 342. Lower plate 341 extends upward from a rear end of electrode terminal 310 and has an upper end slightly protruding forward. And upper plate 342 extends upward from an upper end of lower plate 341 and greatly protrudes rightward of lower plate 341. Six circulation holes 343 each having an elongated circular shape are formed in lower plate 341 so as to be aligned in the left-right direction.

Three first connection terminals 320 are provided at an upper end of upper plate 342 of relay terminal 340 so as to be aligned in the left-right direction at equal intervals. Each first connection terminal 320 has a hook shape that extends upward, then is bent, and extends rearward. Circular through hole 321 is formed in each first connection terminal 320. Nut 322 is fitted into through hole 321.

Second connection terminal 330 is provided at a right end of the upper end of upper plate 342 of relay terminal 340. Second connection terminal 330 has a shape that slightly extends upward, is bent, and extends rearward long. Circular through hole 331 is formed at a distal end of second connection terminal 330.

As illustrated in FIG. 2, in relay terminal 240 of first bus bar 200, an upper surface of lower plate 241 and front and rear surfaces of upper plate 242 are covered with first insulating sheet 600. In relay terminal 340 of second bus bar 300, front and rear surfaces of an upper part of lower plate 341 and front and rear surfaces of upper plate 342 are covered with second insulating sheet 700.

First insulating sheet 600 and second insulating sheet 700 are formed by insulating paper or a resin material having electrical insulation properties, such as acrylic resin or silicone resin. First insulating sheet 600 and second insulating sheet 700 ensure an insulation distance between first bus bar 200 and second bus bar 300, an insulation distance between second bus bar 300 and first end surface electrode 110 of capacitor element 100, and the like.

On a rear side of capacitor element unit 10, three first connection terminals 220 of first bus bar 200 and three first connection terminals 320 of second bus bar 300 are arranged so that each of first connection terminals 220 and each of first connection terminals 320 are alternately disposed in the left-right direction. And second connection terminals 230 of first bus bar 200 and second connection terminals 330 of second bus bar 300 are aligned in the left-right direction.

Figure 5:
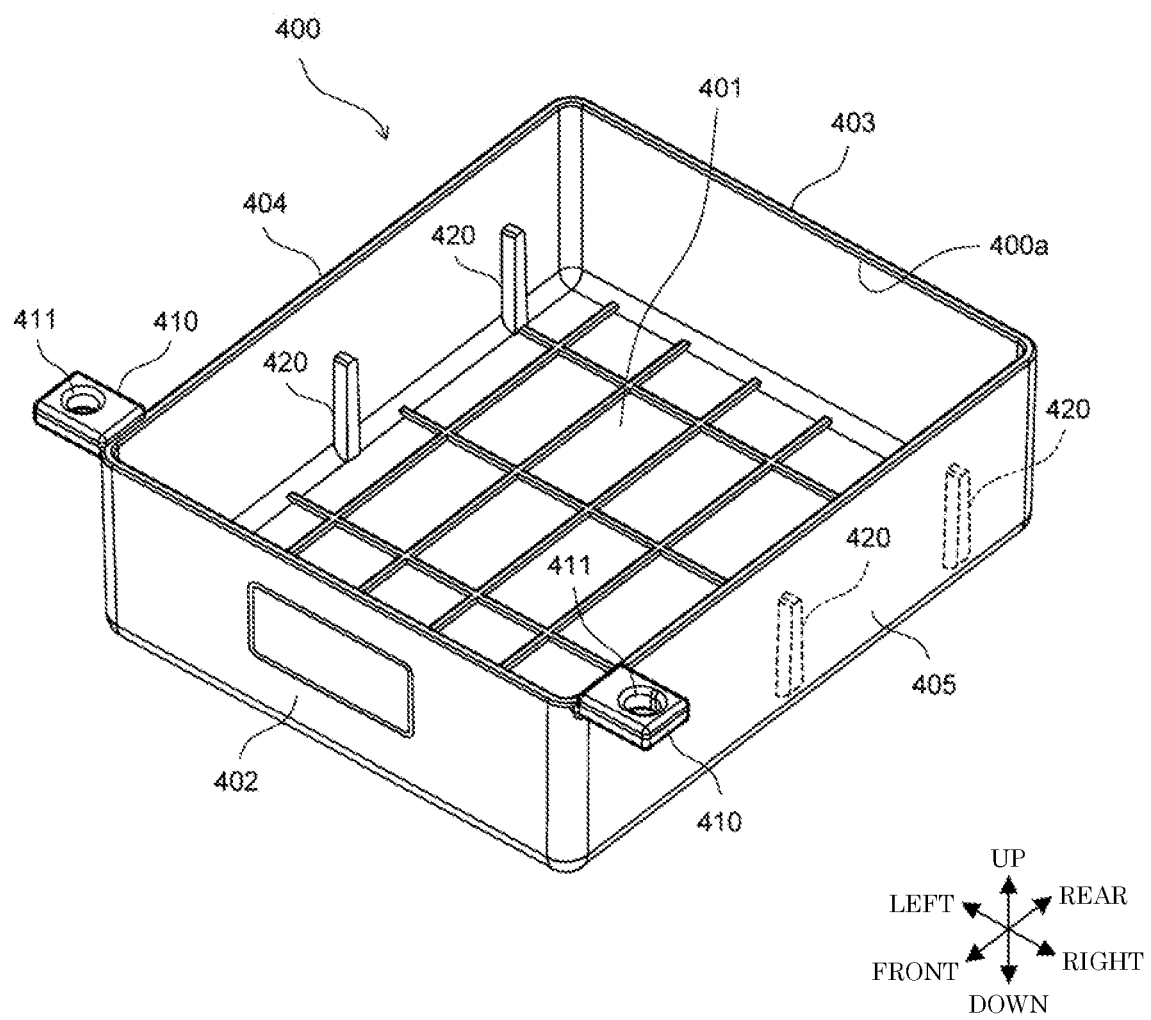
FIG. 5 is a perspective view illustrating the case according to the exemplary embodiment.

FIG. 5 is a perspective view illustrating case 400.

Case 400 is made of resin, for example, polyphenylene sulfide (PPS) which is thermoplastic resin. Case 400 has a substantially rectangular parallelepiped box shape. Case 400 has bottom surface 401, front surface 402, rear surface 403, left side surface 404, and right side surface 405. Each of front surface 402, rear surface 403, left side surface 404, and right side surface 405 rises from bottom surface 401. Case 400 has an opened upper surface.

Attachment tab 410 is formed at an upper end in a front end part of each of left side surface 404 and right side surface 405. Attachment hole 411 is formed in attachment tab 410. These attachment tabs 410 are used for fixing film capacitor 1 to an installation part of an external device such as an inverter device. In each of left side surface 404 and right side surface 405, support rib 420 extending upward from bottom surface 401 is formed at each of two positions in front and rear on an inner wall surface. An interval between front support rib 420 and rear support rib 420 is equal to an interval between front fitting port 251 and rear fitting port 251 of support 250 of first bus bar 200.

As shown in FIG. 1B, capacitor element unit 10 is housed in case 400. At this time, a distal end of support rib 420 on left side surface 404 of case 400 is fitted into fitting port 251 of support 250 that is disposed at left side of first bus bar 200, and a distal end of support rib 420 on right side surface 405 of case 400 is fitted into fitting port 251 of support 250 that is disposed at right side of first bus bar 200. Capacitor element unit 10 is thus positioned in the front-rear, left-right, and up-down directions with respect to case 400. In six capacitor elements 100, first end surface 101, that is, first end surface electrode 110 faces toward opening 400a of case 400, and second end surface 102, that is, second end surface electrode 120 faces toward bottom surface 401 of case 400.

Filling resin 500 in a liquid phase state is injected into case 400. At this time, filling resin 500 passes through circulation holes 313, 343 of second bus bar 300, and thus filling resin 500 easily spreads between capacitor element unit 10 and bottom surface 401 of case 400. Case 400 is filled with filling resin 500 up to a vicinity of opening 400a of case 400, and case 400 is heated after the injection of filling resin 500 is completed. Accordingly, filling resin 500 in case 400 is cured.

Thus, film capacitor 1 is completed as shown in FIG. 1A.

Figure 6:
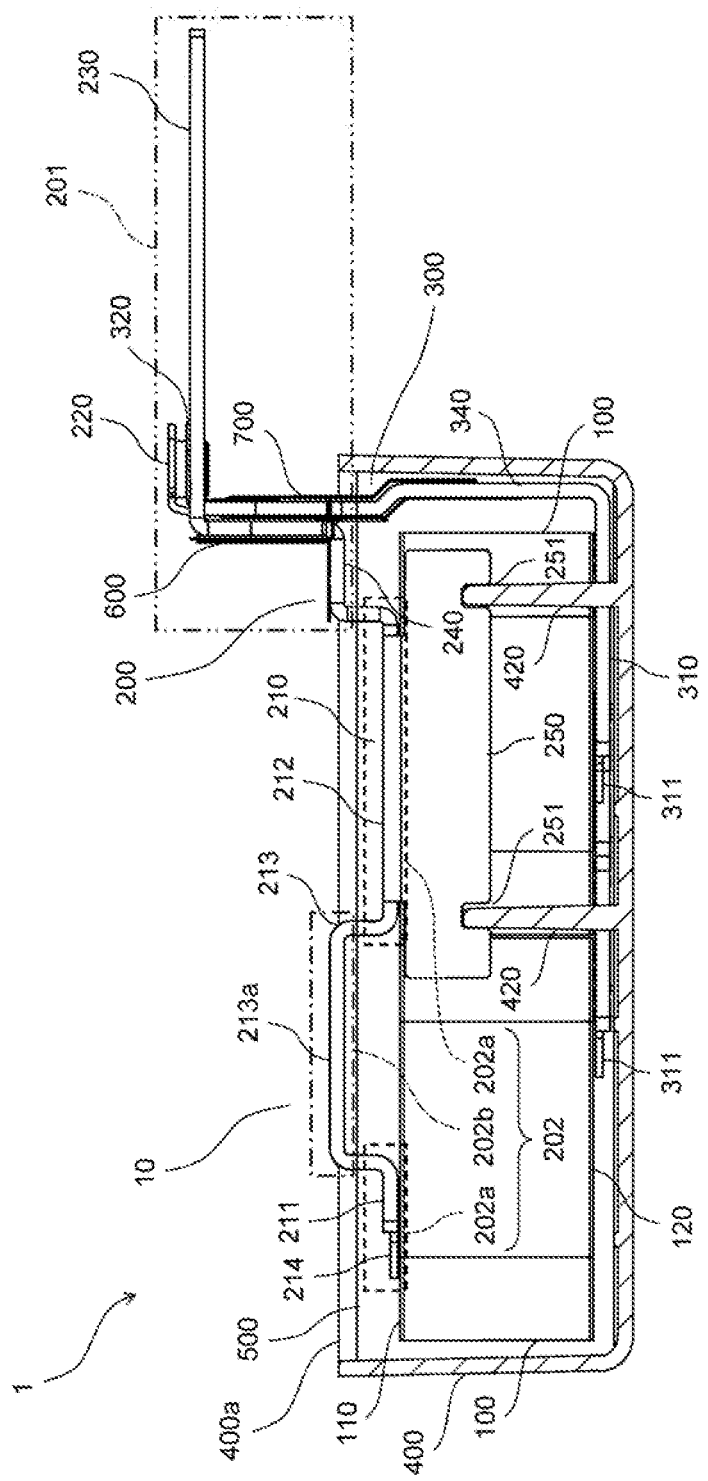
FIG. 6 is a side sectional view illustrating the film capacitor cut at a position of a support rib on a right side of the case according to the exemplary embodiment.

FIG. 6 is a side sectional view of film capacitor 1 cut at a position of support rib 420 disposed at the right side of case 400. In FIG. 6, for convenience, only a casting surface (surface exposed to outside) of filling resin 500 in case 400 is illustrated by a solid line.

As illustrated in FIG. 6, first bus bar 200 includes first section 201 (surrounded by a two-dot chain line) and second section 202. First section 201 is exposed from filling resin 500 in case 400 and includes first connection terminal 220 and second connection terminal 230. Second section 202 has buried section 202a (surrounded by a broken line) buried in filling resin 500 and exposed section 202b (surrounded by a one-dot chain line) exposed from filling resin 500, and includes connection pin 214 connected to first end surface electrode 110. Exposed section 202b is located away from first section 201, that is, separated from first section 201 by buried section 202a disposed at the rear side of first section 201.

Six capacitor elements 100 include capacitor elements 100 arranged in the rear row close to first section 201 and capacitor elements 100 arranged in the front row far from first section 201 in a front-rear direction. Exposed section 202b is disposed in second section 202 so that substantially entirety of exposed section 202b overlaps (overlaps as viewed from above) capacitor element 100 arranged in the front row in the front-rear direction.

Film capacitor 1 can be mounted on, for example, an inverter device for driving an electric motor in an electric vehicle. The inverter device is supplied with direct-current power from a power supply (battery). The inverter device includes an inverter circuit including an insulated gate bipolar transistor (IGBT), converts direct-current power into three-phase alternating-current power, and supplies the three-phase alternating-current power to the electric motor. Corresponding external terminals (not shown) connected to the power supply are connected to second connection terminal 230 of first bus bar 200 and second connection terminal 330 of second bus bar 300 by screwing with use of through holes 231 and 331. Corresponding external terminals (not shown) connected to the inverter circuit are connected to three first connection terminals 220 of first bus bar 200 and three first connection terminals 320 of second bus bar 300 by screwing with use of nuts 222 and 322.

When film capacitor 1 is energized, heat is generated in six capacitor elements 100, first bus bar 200, and second bus bar 300 by a current flowing therethrough. The generated heat is released to outside from first section 201 exposed from filling resin 500 in first bus bar 200, and upper plate 342, first connection terminal 320, and second connection terminal 330 of relay terminal 340 exposed from filling resin 500 in second bus bar 300. Furthermore, in the present exemplary embodiment, the generated heat is released to outside not only from the above parts but also from exposed section 202b disposed in first bus bar 200.

Note that the heat generated in capacitor elements 100 in the front row far from first section 201 of first bus bar 200 is hardly released from first section 201. Since exposed section 202b is disposed in first bus bar 200 so as to overlap capacitor elements 100 in the front row, the heat of capacitor elements 100 in the front row is also adequately released by exposed section 202b.

Note that an upper surface of protrusion 213, which is an upper surface of exposed section 202b, is formed to be flat surface 213a. When film capacitor 1 is mounted on the inverter device, a cooler (not illustrated) prepared in the inverter device can be attached to flat surface 213a. In this case, exposed section 202b is cooled (absorbed heat) by the cooler, and thus effect of heat dissipation from exposed section 202b is further enhanced.

Effects of Exemplary Embodiment

As described above, the present exemplary embodiment exhibits the following effects.

In the configuration of film capacitor 1, first bus bar 200 connected to first end surface electrode 110 of capacitor element 100 includes first section 201 exposed from filling resin 500, and second section 202 having buried section 202a buried in filling resin 500 and exposed section 202b exposed from filling resin 500. Exposed section 202b is located away from first section 201. First section 201 includes first connection terminal 220 and second connection terminal 230 that are connected to the external terminal. Second section 202 includes connection pin 214 connected to first end surface electrode 110.

In this configuration, heat generated in capacitor elements 100 and first bus bar 200 during energization can be released to outside not only from first section 201 of first bus bar 200 but also from exposed section 202b. Hence, the heat dissipation effect is enhanced, and thus film capacitor 1 as a whole is less likely to overheat during energization.

Capacitor element 100 is housed in case 400 such that first end surface 101 faces toward opening 400a of case 400, and second end surface 102 faces toward bottom surface 401 of case 400. First bus bar 200 is connected to first end surface electrode 110 on first end surface 101, and second bus bar 300 is connected to second end surface electrode 120 on second end surface 102. Second section 202 of first bus bar 200 includes a part opposing first end surface 101 (in the exemplary embodiment, electrode terminal 210). And a part of the opposing part protrudes to be away (upward) from first end surface 101 to form exposed section 202b as protrusion 213.

In this configuration, exposed section 200b can be easily formed in first bus bar 202. Furthermore, since a gap for insulation or the like does not need to be formed between capacitor elements 100 and the part where exposed section 200b of first bus bar 202 is formed, exposed section 202b can be provided close to capacitor elements 100. Consequently, the heat generated in capacitor elements 100 is easily transferred to exposed section 202b, and the heat is easily dissipated in exposed section 202b.

When each capacitor element 100 is housed in case 400 such that both end surfaces 101, 102 face toward front and rear side surfaces 402, 403 or left and right side surfaces 404, 405 of case 400, exposed section 202b is formed in a part of first bus bar 200 opposing a peripheral surface of capacitor element 100 that faces toward opening 400a. In this case, a gap for insulation or the like might need to be formed between the opposing part and the peripheral surface of capacitor element 100. Thus, it is difficult to provide exposed section 202b close to capacitor elements 100.

Further, in case 400, a plurality of capacitor elements 100 is disposed in the front-rear direction. The plurality of capacitor elements 100 includes capacitor elements 100 close to first section 201 and capacitor elements 100 far from first section 201 in the front-rear direction. And exposed section 202b is formed in second section 202 such that at least a part of exposed section 202b overlaps capacitor elements 100 far from first section 201 in the front-rear direction.

In this configuration, the heat of capacitor elements 100 far from first section 201 can also be adequately released by exposed section 202b.

Further, exposed section 202b has flat surface 213a.

In this configuration, when film capacitor 1 is mounted on the external device, the cooler prepared in the external device can be mounted on flat surface 213a. And thus the effect of heat dissipation from exposed section 202b is further enhanced.

Modification

Although the exemplary embodiment of the present disclosure has been described above, the present disclosure is not limited to the above exemplary embodiment, and application examples of the present disclosure can be variously modified in addition to the above exemplary embodiment.

For example, in capacitor element unit 10, when a number of capacitor elements 100 is increased in a direction (front-rear direction) in which a distance from first connection terminal 220 and second connection terminal 230, that is, first section 201 changes, a number of exposed sections 202b may be increased since a number of protrusions 213 may be increased accordingly.

Figures 7A, 7B:
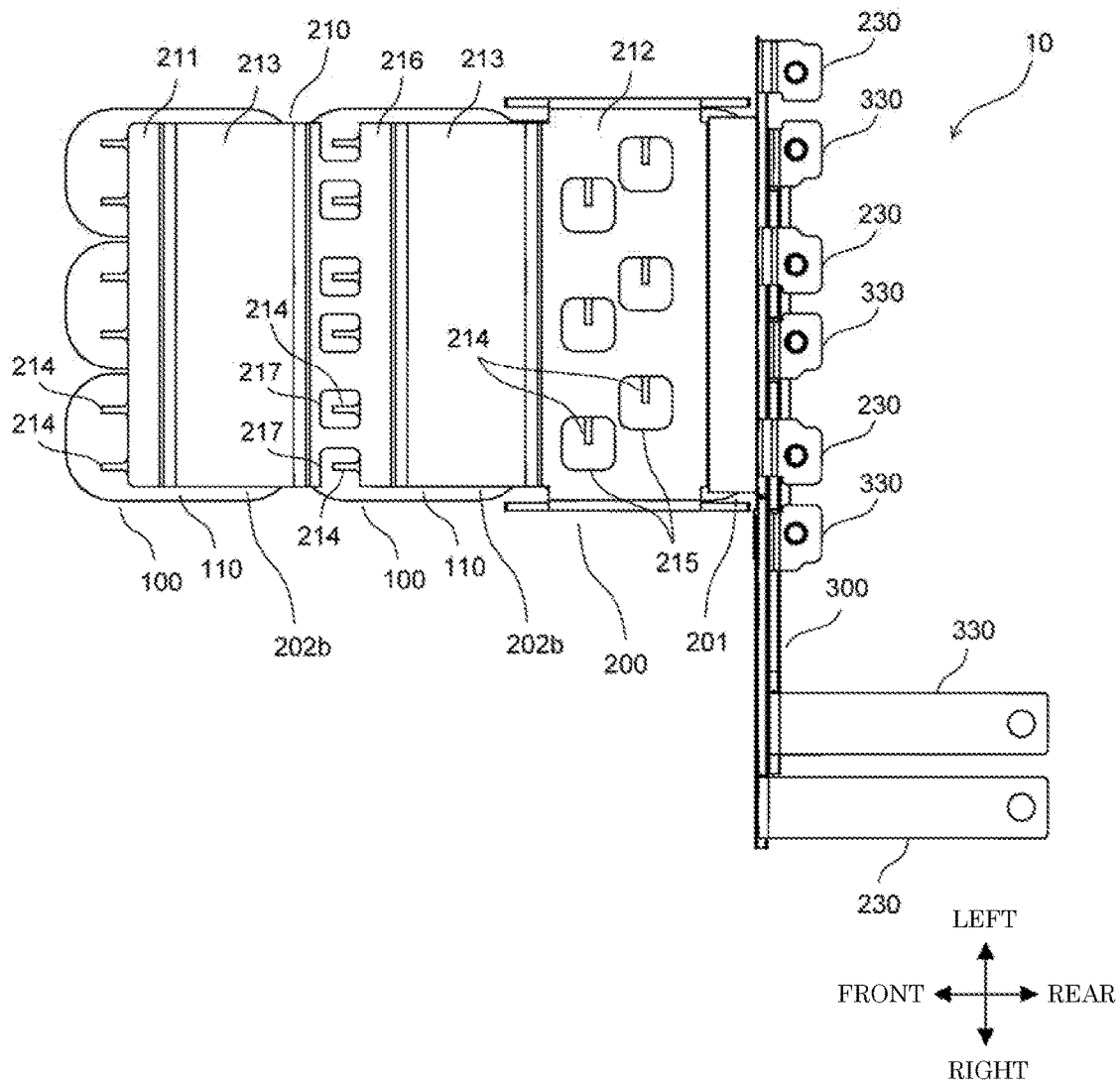
FIG. 7A is a plan view illustrating a capacitor element unit according to a modification.
FIG. 7B is a side view illustrating a capacitor element unit according to the modification.

FIGS. 7A and 7B are a plan view and a side view, respectively, of capacitor element unit 10 according to a modification.

In the present modification, capacitor element unit 10 includes nine capacitor elements 100 arranged in three rows in the front-rear direction. In first bus bar 200, electrode terminal 210 includes two protrusions 213, and intermediate plate 216 disposed between two protrusions 213. Six openings 217 are formed in intermediate plate 216 in the left-right direction, and connection pin 214 is formed at a rear edge of each opening 217. These connection pins 214 are bonded, by a bonding method such as soldering, to first end surface electrodes 110 of three capacitor elements 100 in the second row from the front. Parts of two protrusions 213 exposed from filling resin 500 serve as exposed sections 202b. Substantially entirety of exposed section 202b disposed at the front side overlaps capacitor elements 100 in the front row, and substantially entirety of exposed section 202b disposed at the rear side overlaps capacitor elements 100 in the second row from the front.

In second bus bar 300, similarly, electrode terminal 310 includes connection pins 311 bonded to second end surface electrodes 120 of three capacitor elements 100 in the second row.

In the present modification, the heat generated in capacitor elements 100 on the front row and capacitor elements 100 on the second row from the front is adequately released to outside by exposed sections 202b disposed at the front and the rear.

In the exemplary embodiment, in capacitor element unit 10, the plurality of capacitor elements 100 is arranged in a direction (left-right direction) in which the distance from first section 201 does not change. Alternatively, one capacitor element 100 may be arranged in the above direction. That is, exposed section 202b may be provided in film capacitor 1 in which the plurality of capacitor elements 100 is arranged only in the direction (front-rear direction) in which the distance from first section 201 changes.

In the exemplary embodiment, capacitor elements 100 are arranged such that a longitudinal direction of capacitor elements 100 is a direction (front-rear direction) in which the distance from first section 201 of first bus bar 200 changes. Alternatively, capacitor elements 100 may be arranged such that a short direction of capacitor elements 100 is the direction (front-rear direction) in which the distance from first section 201 of first bus bar 200 changes.

Further, in the exemplary embodiment, substantially entirety of exposed section 202b overlaps capacitor elements 100 far from first section 201 of first bus bar 200. Alternatively, it is sufficient that at least a part, preferably a half or more of exposed section 202b overlaps capacitor elements 100 far from first section 201.

Further, in the above exemplary embodiment, first bus bar 200 and second bus bar 300 each include three first connection terminals 220, 320. Alternatively, the number of first connection terminals 220, 320 may be appropriately changed.

In the exemplary embodiment, only first bus bar 200 includes first section 201 and second section 202 including exposed section 202b. Alternatively, in addition to first bus bar 200, second bus bar 300 may also include a first section and a second section including an exposed section.

In the exemplary embodiment, first bus bar 200 is a negative-pole bus bar, and second bus bar 300 is a positive-pole bus bar. Alternatively, first bus bar 200 may be a positive-pole bus bar, and second bus bar 300 may be a negative-pole bus bar.

Further, in the above exemplary embodiment, each capacitor element 100 is formed by stacking two metallized films with aluminum vapor-deposited on a dielectric film, and winding or laminating the stacked metallized films. Alternatively, capacitor element 100 may be formed by stacking a metallized film with aluminum vapor-deposited on both surfaces of a dielectric film, and an insulating film, and winding or laminating the metallized film and the insulating film.

In the exemplary embodiment, film capacitor 1 is cited as an example of the capacitor of the present disclosure. Alternatively, the present disclosure can also be applied to capacitors other than film capacitor 1.

In addition, various modifications can be made to the exemplary embodiment of the present disclosure as appropriate within the scope of the technical idea described in the claims.

In the description of the exemplary embodiment, terms indicating directions such as "upward" and "downward" indicate relative directions that depend only on a relative positional relationship of constituent members, and do not indicate absolute directions such as a vertical direction and a horizontal direction.

The present disclosure is useful for capacitors used for various electronic devices, electric devices, industrial devices, electric components of vehicles, and the like.

What is claimed is:

1. A capacitor comprising:
   a capacitor element;
   a first bus bar connected to a first electrode of the capacitor element;
   a case housing the capacitor element; and
   a filling resin filled in the case, wherein:
   the first bus bar includes a first section and a second section,
   the first section is exposed from the filling resin and includes a connection terminal configured to be connected to an external terminal,
   the second section has a buried section buried in the filling resin and an exposed section exposed from the filling resin and includes a connection part connected to the first electrode, the exposed section being located away from the first section,
   the case has a bottom surface, four side surfaces each rising from the bottom surface, and an opening at an upper surface facing the bottom surface, and
   the exposed section as a whole overlaps the capacitor element viewed from a direction perpendicular to the bottom surface of the case.

2. The capacitor according to claim 1, further comprising a second bus bar, wherein:
   the capacitor element is housed in the case so that a first end surface of the capacitor element faces toward the opening of the case and a second end surface of the capacitor element faces toward the bottom surface of the case,
   the first bus bar is connected to the first electrode disposed on the first end surface,
   the second bus bar is connected to a second electrode disposed on the second end surface, and
   the exposed section is configured so that a part of the second section faces the first end surface and protrudes to be away from the first end surface.

3. The capacitor according to claim 1, wherein:
   a plurality of capacitor elements each being the capacitor element are arranged in a first direction in the case,
   the plurality of capacitor elements includes a first capacitor element and a second capacitor element, the first capacitor element being disposed close to the first section, the second capacitor element being disposed farther from the first section than the first capacitor element in the first direction, and
   the exposed section is located in the second section so that at least a part of the exposed section overlaps the second capacitor element.

4. The capacitor according to claim 1, wherein the exposed section has a flat surface.

5. The capacitor according to claim 1, wherein in viewing in a direction perpendicular to the bottom surface, the first section and the exposed section are exposed from a region of the filling resin, the region being in the opening.

6. The capacitor according to claim 1, wherein the exposed section is disposed on top of the upper surface of the case viewed from a direction parallel to the bottom surface of the case.

7. A capacitor comprising:
a capacitor element;
a first bus bar connected to a first electrode of the capacitor element;
a case housing the capacitor element; and
a filling resin filled in the case, wherein:
the first bus bar includes a first section and a second section,
the first section is exposed from the filling resin and includes a connection terminal configured to be connected to an external terminal,
the second section has a first buried section buried in the filling resin and an exposed section exposed from the filling resin, the exposed section being located away from the first section,
the first buried section as a whole is located farther from the first section than the exposed section.

8. The capacitor according to claim 7, wherein:
the second section further has a second buried section buried in the filling resin, and
the second buried section is located between the first section and the exposed section.

9. The capacitor according to claim 8, wherein the second section is connected to the first electrode at at least one of the first buried section or the second buried section.

10. The capacitor according to claim 7, further comprising a second bus bar, wherein:
the capacitor element is housed in the case so that a first end surface faces toward an opening of the case and a second end surface faces toward a bottom surface of the case,
the first bus bar is connected to the first electrode disposed on the first end surface,
the second bus bar is connected to a second electrode disposed on the second end surface, and
the exposed section is configured so that a part of the second section faces the first end surface and protrudes to be away from the first end surface.

11. The capacitor according to claim 7, wherein:
a plurality of capacitor elements each being the capacitor element are arranged in a first direction in the case,
the plurality of capacitor elements includes a first capacitor element and a second capacitor element, the first capacitor element being disposed close to the first section, the second capacitor element being disposed farther from the first section than the first capacitor element in the first direction, and
the exposed section is located in the second section so that at least a part of the exposed section overlaps the second capacitor element.

12. The capacitor according to claim 7, wherein:
the case has a bottom surface, four side surfaces each rising from the bottom surface, and an opening at an upper face facing bottom surface, and
in viewing in a direction perpendicular to the bottom surface, the first section and the exposed section are exposed from a region of the filling resin, the region being in the opening.

13. The capacitor according to claim 7, wherein
the case has a bottom surface, four side surfaces each rising from the bottom surface, and an opening at an upper surface facing the bottom surface, and
the exposed section as a whole overlaps the capacitor element viewed from a direction perpendicular to the bottom surface of the case.

* * * * *